US012770013B2

(12) United States Patent
Kanazawa et al.

(10) Patent No.: US 12,770,013 B2
(45) Date of Patent: Oct. 20, 2026

(54) REINFORCEMENT LEARNING SYSTEM FOR MAINTENANCE DECISION MAKING

(71) Applicant: Hitachi, Ltd., Tokyo (JP)

(72) Inventors: Takuya Kanazawa, Santa Clara, CA (US); Ahmed Farahat, Santa Clara, CA (US); Haiyan Wang, Fremont, CA (US); Chetan Gupta, San Mateo, CA (US); Hamed Khorasgani, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 840 days.

(21) Appl. No.: 18/102,388

(22) Filed: Jan. 27, 2023

(65) Prior Publication Data

US 2024/0255939 A1 Aug. 1, 2024

(51) Int. Cl.
*G06N 3/092* (2023.01)
*G05B 23/02* (2006.01)
*G06N 5/045* (2023.01)

(52) U.S. Cl.
CPC ......... *G06N 3/092* (2023.01); *G05B 23/0283* (2013.01); *G06N 5/045* (2013.01)

(58) Field of Classification Search
CPC ..... G06N 3/092; G06N 5/045; G05B 23/0283
See application file for complete search history.

(56) References Cited

U.S. PATENT DOCUMENTS

| | | | |
|---|---|---|---|
| 2015/0227838 A1 | 8/2015 | Wang et al. | |
| 2017/0083822 A1 | 3/2017 | Adendorff et al. | |
| 2019/0384257 A1 | 12/2019 | Zhang et al. | |
| 2021/0285672 A1 | 9/2021 | Samusevich et al. | |
| 2021/0323167 A1 | 10/2021 | Hemes et al. | |
| 2022/0004182 A1 | 1/2022 | Natsumeda et al. | |
| 2022/0391670 A1 | 12/2022 | Dalli et al. | |
| 2022/0398460 A1 | 12/2022 | Dalli et al. | |
| 2023/0185268 A1* | 6/2023 | Moradian .............. | G06Q 50/04 700/121 |
| 2023/0256593 A1* | 8/2023 | Zolna ....................... | B25J 9/161 706/21 |

OTHER PUBLICATIONS

Khorasgani, Hamed, et al. "An offline deep reinforcement learning for maintenance decision-making." arXiv preprint arXiv: 2109. 15050 (2021). (Year: 2021).*

(Continued)

*Primary Examiner* — Hal Schnee
(74) *Attorney, Agent, or Firm* — PROCOPIO, CORY, HARGREAVES & SAVITCH LLP

(57) ABSTRACT

A method for predictive maintenance of equipment. The method may include receiving expected future return value as input to a decision maker model, wherein the decision maker model is a machine learning model that predicts maintenance action associated with the equipment; feeding recent observations and recent actions from environment as inputs to the decision maker model; generating a next action as model outputs of the decision maker model, wherein the next action is the predicted maintenance action; and executing the next action in the environment.

20 Claims, 10 Drawing Sheets

(56) References Cited

OTHER PUBLICATIONS

Brandfonbrener, David, et al. "When does return-conditioned supervised learning work for offline reinforcement learning?." Advances in Neural Information Processing Systems 35 (2022): 1542-1553. (Year: 2022).*
Vouros, George A. "Explainable deep reinforcement learning: state of the art and challenges." ACM Computing Surveys 55.5 (2022): 1-39. (Year: 2022).*
Cai, Carrie J., Jonas Jongejan, and Jess Holbrook. "The effects of example-based explanations in a machine learning interface." Proceedings of the 24th international conference on intelligent user interfaces. 2019. (Year: 2019).*

Botari, Tiago, et al. "MeLIME: Meaningful local explanation for machine learning models." arXiv preprint arXiv:2009.05818 (2020). (Year: 2020).*
Matzka, Stephan. "Explainable artificial intelligence for predictive maintenance applications." 2020 third international conference on artificial intelligence for industries (ai4i). IEEE, 2020. (Year: 2020).*
Office Action dated Aug. 19, 2024, in counterpart Japanese Application No. 2023-191931, 10 pages.
Sergey Levine et al. "Offline Reinforcement Learning: Tutorial, Review, and Perspectives on Open Problems." arXivLabs. Nov. 1, 2020. 43 pages.
Juergen Schmidhuber. "Reinforcement Learning Upside Down: Don't Predict Rewards—Just Map Them to Actions." arXivLabs. Jun. 23, 2020. 22 pages.
Rupesh Kumar Srivastava et al. "Training Agents using Upside-Down Reinforcement Learning." arXivLabs. Sep. 3, 2021. 31 pages.
Lili Chen et al. "Decision Transformer: Reinforcement Learning via Sequence Modeling." arXivLabs. Jun. 24, 2021. 21 pages.
Ashish Vaswani et al. "Attention Is All You Need." arXivLabs. Dec. 6, 2017. 15 pages.
Sheikh Rabiul Islam et al. "Explainable Artificial Intelligence Approaches: A Survey." arXivLabs. Jan. 23, 2021. 14 pages.

* cited by examiner

Sensor data (may include image data as well)

| Time stamp | Machine ID: 1 | Machine ID: 1 | Machine ID: 2 | Machine ID: 2 | Machine ID: 3 | Machine ID: 3 | ... |
|---|---|---|---|---|---|---|---|
| 2021/12/10 13:30 | (1.2, 0.3, 108.1) | Normal | (26.6, 8.9, 0.15) | Normal | (-4.4, 33.5, 6.4) | Normal | ... |
| 2021/12/10 13:40 | (1.3, 0.2, 110.7) | Normal | (25.0, 7.9, 0.12) | Normal | (-4.8, 31.9, 6.6) | Normal | ... |
| 2021/12/10 13:50 | (1.4, 0.3, 111.4) | Normal | (23.8, 8.1, 0.0) | Out of order | (-4.5, 30.7, 6.5) | Normal | ... |
| ⋮ | ⋮ | ⋮ | ⋮ | ⋮ | ⋮ | ⋮ | ⋮ |

| Time stamp | Revenue (left) and repair cost (right) of each machine | | | | | | |
|---|---|---|---|---|---|---|---|
| | Machine ID: 1 | | Machine ID: 2 | | Machine ID: 3 | | ... |
| 2021/12/10 13:30 | 1 | 0 | 3 | 0 | 14 | 0 | ... |
| 2021/12/10 13:40 | 1 | 0 | 3 | 0 | 14 | 0 | ... |
| 2021/12/10 13:50 | 1 | 0 | 0 | 0 | 14 | 0 | ... |
| ⋮ | ⋮ | | ⋮ | | ⋮ | | ⋮ |

| Time stamp | Total reward |
|---|---|
| 2021/12/10 13:30 | 3.7 |
| 2021/12/10 13:40 | 3.7 |
| 2021/12/10 13:50 | -5.1 |
| ⋮ | ⋮ |

FIG. 7

REINFORCEMENT LEARNING SYSTEM FOR MAINTENANCE DECISION MAKING

BACKGROUND

Field

The present disclosure is generally directed to a method and a system using offline reinforcement learning (RL) for predictive maintenance of equipment.

Related Art

Industrial equipment is subject to degradation over time. Reduction of maintenance cost is one of major concerns for industrial organizations. The maintenance cost includes not only the repair cost of equipment and labor cost of workers, but also other miscellaneous factors such as the economic loss due to downtime of equipment and physical space occupied during repair or replacement. If equipment is inspected less often to reduce repair cost, the probability of sudden failures will increase; once the equipment fails, the cost of replacement is substantial. If the equipment is frequently inspected and repaired, the risk of unexpected failure is lessened, but the maintenance cost becomes substantial.

In the related art, past observations of equipment during last examined time interval are used in failure prediction over subsequent time interval. However, it is a human operator/user who receives the output of the models and makes the decision on when to repair the equipment.

In the related art, machine learning models are used for time-series analysis (e.g., LSTM and functional neural network) to estimate remaining useful life (RUL) based on historical record of observations and failures. Again, it is a human operator/user who receives the output of the models and makes the decision on when to repair the equipment.

There exists a need for smart preventive/predictive maintenance for deciding the right timing of maintenance activities that avoid premature or unnecessary maintenance and, at the same time, reduce the risk of equipment downtime associated with unexpected failures. An effective maintenance plan must also take into consideration various constraints such as the maximum number of equipment that can be repaired simultaneously.

SUMMARY

Aspects of the present disclosure involve an innovative method for predictive maintenance of equipment. The method may include receiving expected future return value as input to a decision maker model, wherein the decision maker model is a machine learning model that predicts maintenance action associated with the equipment; feeding recent observations and recent actions from environment as inputs to the decision maker model; generating a next action as model outputs of the decision maker model, wherein the next action is the predicted maintenance action; and executing the next action in the environment.

Aspects of the present disclosure involve an innovative non-transitory computer readable medium, storing instructions for predictive maintenance of equipment. The instructions may include receiving expected future return value as input to a decision maker model, wherein the decision maker model is a machine learning model that predicts maintenance action associated with the equipment; feeding recent observations and recent actions from environment as inputs to the decision maker model; generating a next action as model outputs of the decision maker model, wherein the next action is the predicted maintenance action; and executing the next action in the environment.

Aspects of the present disclosure involve an innovative server system for predictive maintenance of equipment. The system may include receiving expected future return value as input to a decision maker model, wherein the decision maker model is a machine learning model that predicts maintenance action associated with the equipment; feeding recent observations and recent actions from environment as inputs to the decision maker model; generating a next action as model outputs of the decision maker model, wherein the next action is the predicted maintenance action; and executing the next action in the environment.

Aspects of the present disclosure involve an innovative system for predictive maintenance of equipment. The system can include means for receiving expected future return value as input to a decision maker model, wherein the decision maker model is a machine learning model that predicts maintenance action associated with the equipment; means for feeding recent observations and recent actions from environment as inputs to the decision maker model; means for generating a next action as model outputs of the decision maker model, wherein the next action is the predicted maintenance action; and means for executing the next action in the environment.

BRIEF DESCRIPTION OF DRAWINGS

A general architecture that implements the various features of the disclosure will now be described with reference to the drawings. The drawings and the associated descriptions are provided to illustrate example implementations of the disclosure and not to limit the scope of the disclosure. Throughout the drawings, reference numbers are reused to indicate correspondence between referenced elements.

FIG. 7 illustrates example data tables stored in database 212, in accordance with an example implementation.

DETAILED DESCRIPTION

Figure 1:
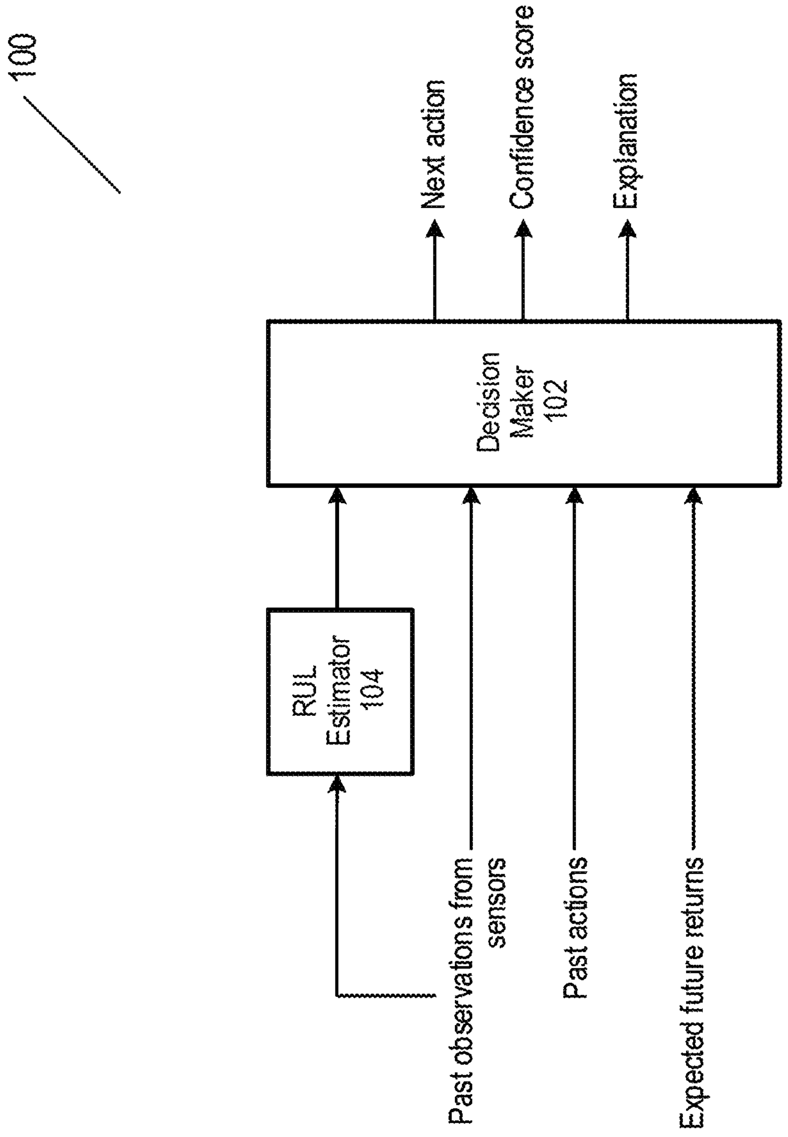
FIG. 1 illustrates an example offline RL system, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination, and the functionality of the example implementations can be implemented through any means according to the desired implementations.

Sequential decision making under uncertainty is more challenging than a one-time optimization because the current state of the system changes continuously in time and future states depend on the current and past decisions in a nonlinear way. Reinforcement Learning (RL) based on deep neural networks is a promising approach to tackle such problems. An RL agent acts in a Markovian environment with state $s_t$. The next state $s_{t+1}$ is sampled from the transition probability $P(s_t, a_t)$, where $a_t$ is the action of the RL agent in state $s_t$. The RL agent receives a reward $r(s_t, a_t) \in \mathbb{R}$ at every time step. The goal is to learn a policy $\pi$ (a map from the state space to the action space) that maximizes the expected sum of rewards $\mathbb{E}[\Sigma_t \gamma^t r_t]$ over multiple timesteps called an episode. Such cumulative rewards are often called return.

Figure 6:
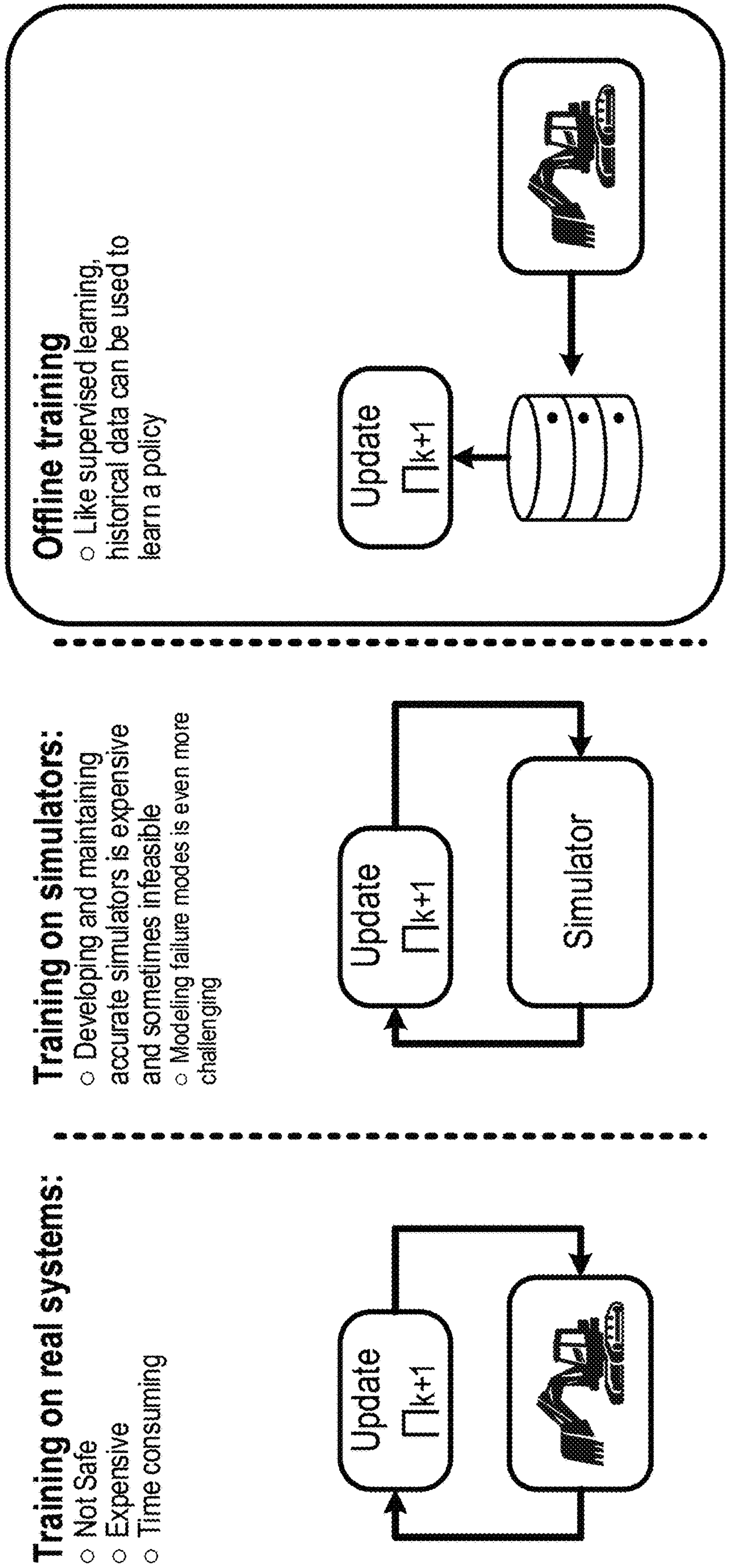
FIG. 6 illustrates difference between offline deep RL learning and training on real systems, as well as training on simulators.

FIG. 6 illustrates difference between offline deep RL learning and training on real systems, as well as training on simulators. RL tries to optimize the whole sequence of actions to solve a temporarily extended control problem. Successful applications of RL to real-world problems have been scarce due to the required training time and associated expenses. With training on real systems, safety also become a concern in real time operations. On the other hand, training on simulators in the conventional online RL setting can be expensive and sometimes infeasible. In addition, failure mode modeling itself poses a challenge in performing training on simulators. In contrast to conventional online RL algorithms that need a high-fidelity simulator, offline RL does not require a simulator and, instead, learns useful skills from the dataset of past actions and observations.

While accurate simulators of equipment are seldom available, historical records of sensor data and repair are readily available without additional cost. In the event that dataset contains few or no repair data, repair data can be artificially inserted mid-episode, and the equipment is then reset to its initial conditions. Offline RL requires no live interaction with the environment and develops useful skill sets from datasets. Optimization of maintenance can be formulated as a supervised machine learning problem and enable the RL agent to acquire effective maintenance skills even when historical record of maintenance comprises logs of poor operations. In addition, the RL agent is endowed with an explainable-AI module that makes the model more interpretable to users by offering meaningful explanations on the RL agent's action policy.

FIG. 1 illustrates an example offline RL system 100, in accordance with an example implementation. As illustrated in FIG. 1, the offline RL system 100 comprises a decision maker 102. During training phase, the decision maker 102 may receive past observations from sensors, past actions, and expected future returns as inputs and generates next action, a confidence score, and explanation as outputs. In post-training and during the model application phase, the decision maker 102 may receive current observations, recent actions, and desired-to-go to generate predictions based on the inputs. In some example implementations, the offline RL system 100 further comprises a remaining useful life (RUL) estimator 104. The RUL estimator receives past observations from sensors as input and generates estimate of RUL as input to the decision maker 102.

The decision maker 102 is a machine learning (ML) model such as, but not limited to, multilayer perceptron, convolutional neural network, transformer, Support Vector Machine (SVM), Hidden Markov Model, Gaussian Processes, logistic regression, Gated Recurrent Unit (GUR), Long Short-Term Memory (LSTM), etc. In principle, any ML can perform the job of the decision maker 102. Considering that inputs to decision maker 102 are time-series data, ML models tailored for sequential data such as Transformer and Recurrent Neural Networks (e.g., LSTM, GRU) may perform better than others. Inputs to the decision maker 102 comprise:

For a given window T, at each given time k:

$$\text{Observations: } O_k^T = \{o_{k-T+1}, \ldots, o_k\},$$

$$\text{Actions: } A_{k-1}^T = \{a_{k-T}, \ldots, a_{k-1}\},$$

Larger T allows more informative input to decision maker 102 and leads to improved performance. However, increased feature dimensions require wider neural networks, more hidden layers, longer training time, etc., which makes supervised learning computationally more expensive. Future cumulative rewards for a horizon H (estimated using offline data):

$$r_k^H = \sum_{i=k}^{H} r_i$$

$$R_k^H = \{r_{k-T+1}^H, \ldots, r_k^H\}, \text{ where } R_k^H$$

is the return-to-go/expected future return value and represents desired return from now until the end of the current episode.

For a model without the RUL estimator 104:

$$\hat{a}_k, c_k, E_k = \text{model}(O_k^T, A_{k-1}^T, R_k^H)$$

For a model with utilizing the RUL estimator 104 for extra input:

$$\hat{a}_k, c_k, E_k = \text{model}(O_k^T, A_{k-1}^T, R_k^H, RUL)$$

where $c_k$ represents the model's confidence (or uncertainty) on $\hat{a}_k$, and $E_k$ represents explanation of decision maker 102's decision. $\hat{a}_k$ is the next action generated by the decision maker 102.

Figure 8:
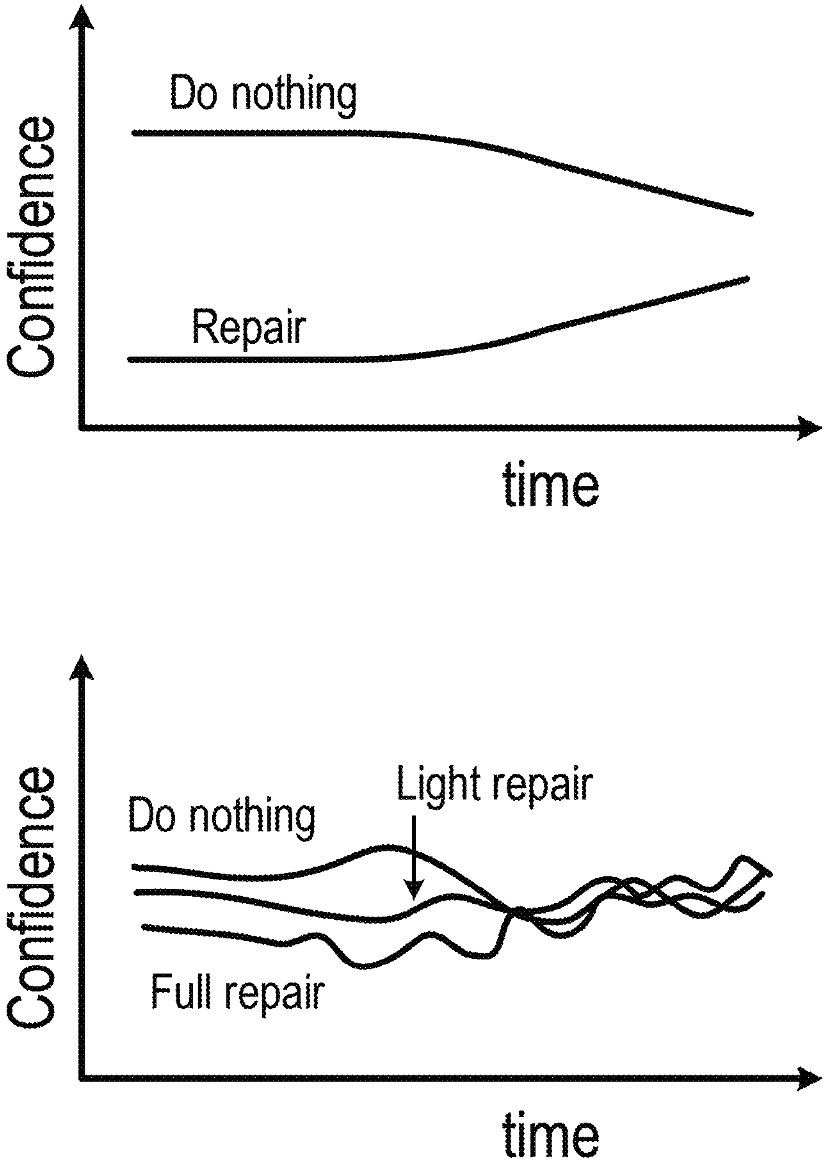
FIG. 8 illustrates example relationships between time and confidence in a model.

The model's confidence, $c_k$, may be generated using at least one of, but not limited to, Bayesian neural network, Deep Ensembles, Monte Carlo Dropout, Quantile Neural Network, etc. The model's confidence provides information about the reliability of the RL model to the operators and assists in determining whether retraining of the RL model is needed. When action space is discrete, standard ML classifiers such as support vector machines, QDA, decision trees, etc. provide probabilities for each action at no additional computational cost. FIG. 8 illustrates example relationships between time and confidence in a model. Taking the top figure of FIG. 8 as example, suppose the model yields confidence score for each action, and the recommended action is "do nothing", the generated confidence is shown as slowly decreasing as time progress. One can infer that repair will soon be recommended based on the progression. Taking the bottom figure of FIG. 8 as example, the model's confidence is approximately the same across all actions. Specifically, the model is not able to prioritize actions. This may indicate that equipment or machine's behavior is novel in view of past records, which prompts retraining of the machine using newly obtained data.

The decision maker 102 is trained using past records of maintenance and does not require online interactions with simulators. In addition, the decision maker 102 yields the maintenance decision itself directly rather than indirect signatures such as failure probability and RUL. The reward r is designed in advance by human operators, and reflects economic costs of repair, replacement, and failure.

Figure 2:
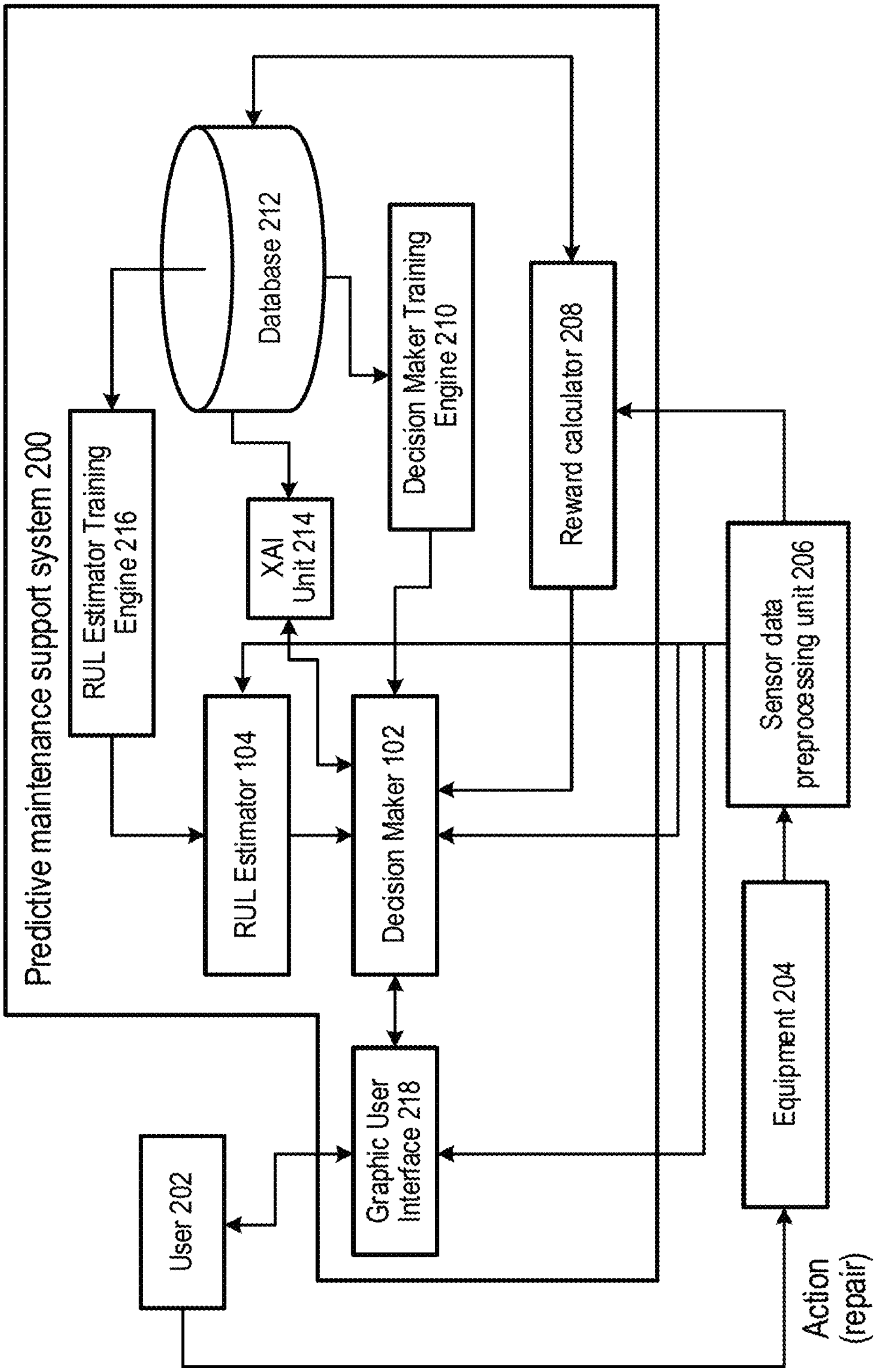
FIG. 2 illustrates an example predictive maintenance support system, in accordance with an example implementation.

FIG. 2 illustrates an example predictive maintenance support system 200, in accordance with an example implementation. As illustrated in FIG. 2, the predictive maintenance support system 200 comprises a decision maker 102, a reward calculator 208, a decision maker training engine 210, database 212, XAI unit 214, and a graphic user interface (GUI) 218. In some example implementations, the predictive maintenance support system 200 further comprises an RUL estimator 104 and an RUL estimator training engine 216. While the RUL estimator 104 is optional, however, if the RUL estimator 104's prediction is accurate, this in turn improves the decision maker 102's performance.

On receiving an instruction for an action or repair from user 202, the equipment 204 performs the action/repair as instructed. Sensors such as, but not limited to, sensors internal to equipment 204, sensors connected to equipment 204, sensors external to equipment 204, etc. generate sensor data by monitoring the performance of equipment 204. In some example implementations, sensor data is received by the sensor data preprocessing unit 206 to perform data processing such as, but not limited to, noise removal, dimensional reduction, etc.

The processed data generated by the sensor data preprocessing unit 206 is then forwarded to the reward calculator 208, the decision maker 102, the RUL estimator 104, and the GUI 218. Sensor data and the processed data may be stored at database 212. The database 212 stores historical records/data pertaining to past observations, past actions, associated rewards, and associated predicted actions. Reward generated from the reward calculator 208 may also be stored in the database 212.

Decision maker training engine 210 and RUL estimator training engine 216 retrieve historical records/data from the database 212 to generate trained decision maker 102 and RUL estimator 104. The RUL estimator 104 receives processed data as input and generates estimated RUL as input to the decision maker 102. The decision maker 102 receives explanation, processed data, and reward associated with the processed data as inputs and generates a next action, and a confidence score. The explanation is generated by the XAI unit 214. The XAI unit 214 accesses both the database 212 and the decision maker 102 to analyze the inner workings of the decision maker 102 and thereby creating human-readable explanations. After which the explanation is sent from the decision maker 102 to the GUI 218.

Figure 9:
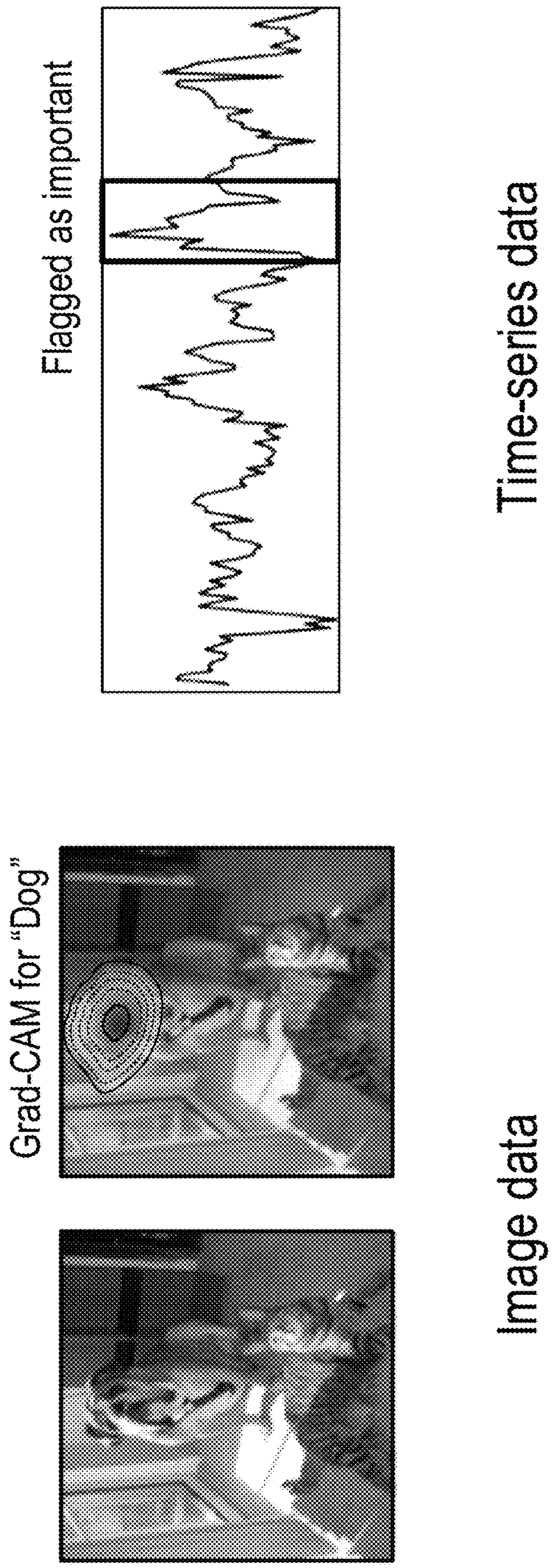
FIG. 9 illustrates two different applications of feature-wise explanation.
Figure 10:
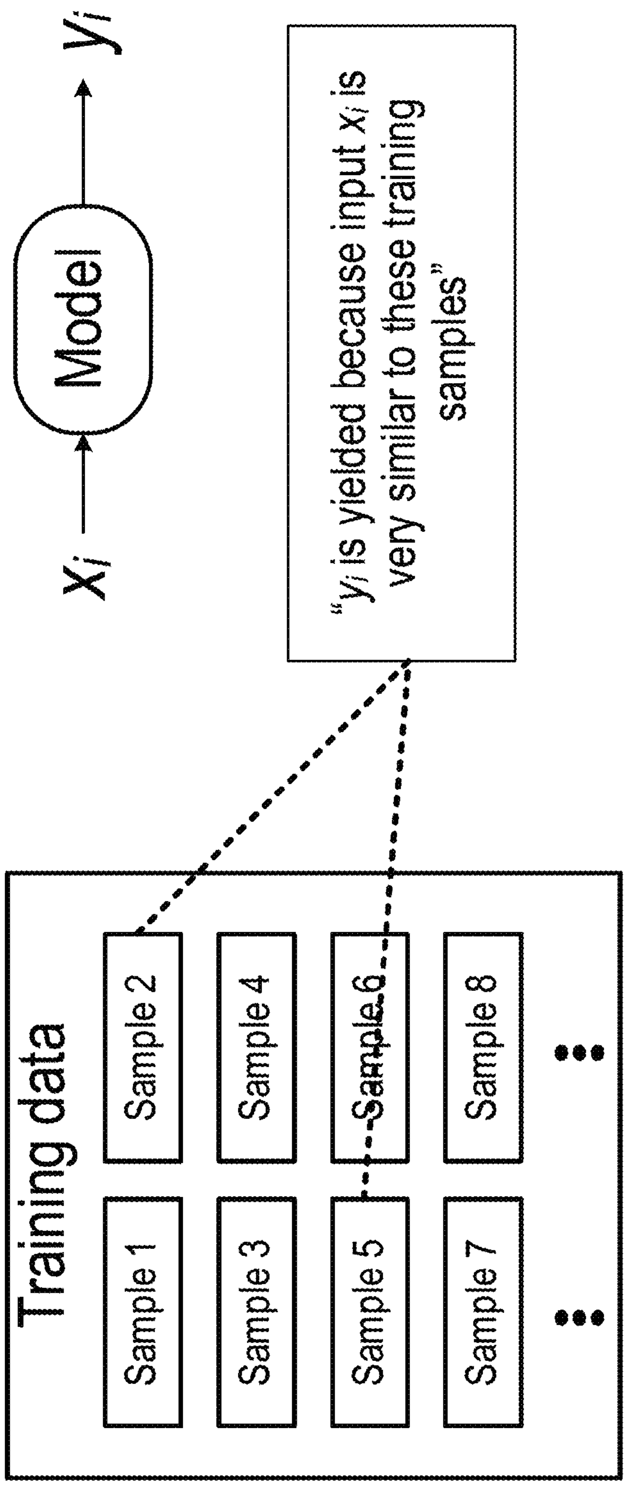
FIG. 10 illustrates an example application of instance-wise explanation.

The XAI unit 214 may provide two types of explanations on AI's decision. The first is a feature-wise explanation, which decomposes the final outcome of the RL model to contributions of individual features and identifies feature(s) most responsible for the outcome. Feature-wise explanation may be generated from explainer-visualizer models such as, but not limited to, Local Interpretable Model-agnostic Explanations (LIME), SHapley Additive exPlanations (SHAP), Gradient-weighted Class Activation Mapping (Grad-CAM), etc. FIG. 9 illustrates two different applications of feature-wise explanation. As illustrated in FIG. 9, the left figures utilize Grad-CAM method to identify the feature "dog" and the right figure shows identification of important features in time-series data. The second type of explanation is instance-wise explanation, which shows which labeled samples in the training dataset are most influential on the RL model's output for a specific input. FIG. 10 illustrates an example application of instance-wise explanation. As illustrated in FIG. 10, using $x_i$ as input, $y_i$ is generated as the model output. This is because input $x_i$ is similar to certain identified training samples, for example, samples 2, 5, and 6. Instance-wise explanation may be generated from methods such as, but not limited to, influence function, etc. The XAI unit 214 greatly eases the root cause analysis of equipment failures and shortens the downtime for repair. For example, if a message like "Repair is recommended. This decision has been made mainly based on the signal of sensor 2 over the last 10 minutes." is generated, engineers can learn what anomaly has been detected in which part of the equipment, allowing for quicker and smoother repair actions. In addition, high uncertainty scores presented by AI could inform engineers of an urgent need of extra training of the decision maker 102 using new data. Outputs from the decision maker 102 and sensor data preprocessing unit 206 are received at the GUI 218, where the outputs are displayed to the user 202.

FIG. 7 illustrates example data tables stored in database 212, in accordance with an example implementation. As illustrated in FIG. 7, such data tables may include information such as, but not limited to, sensor data, revenue associated with each machine, repair cost associated with each machine, and rewards. The top table identifies machines/sensors and the associated operating states and each entry is associated with a unique time stamp. For example, the first entry has a time stamp of "2021/12/10 13:30" and machines/sensors operating at that time and associated states are tracked. The bottom left table identifies machines/sensors with associated revenue and repair cost, and each entry is associated with a unique time stamp. The bottom right table identifies total rewards associated with the time stamps.

Figure 3:
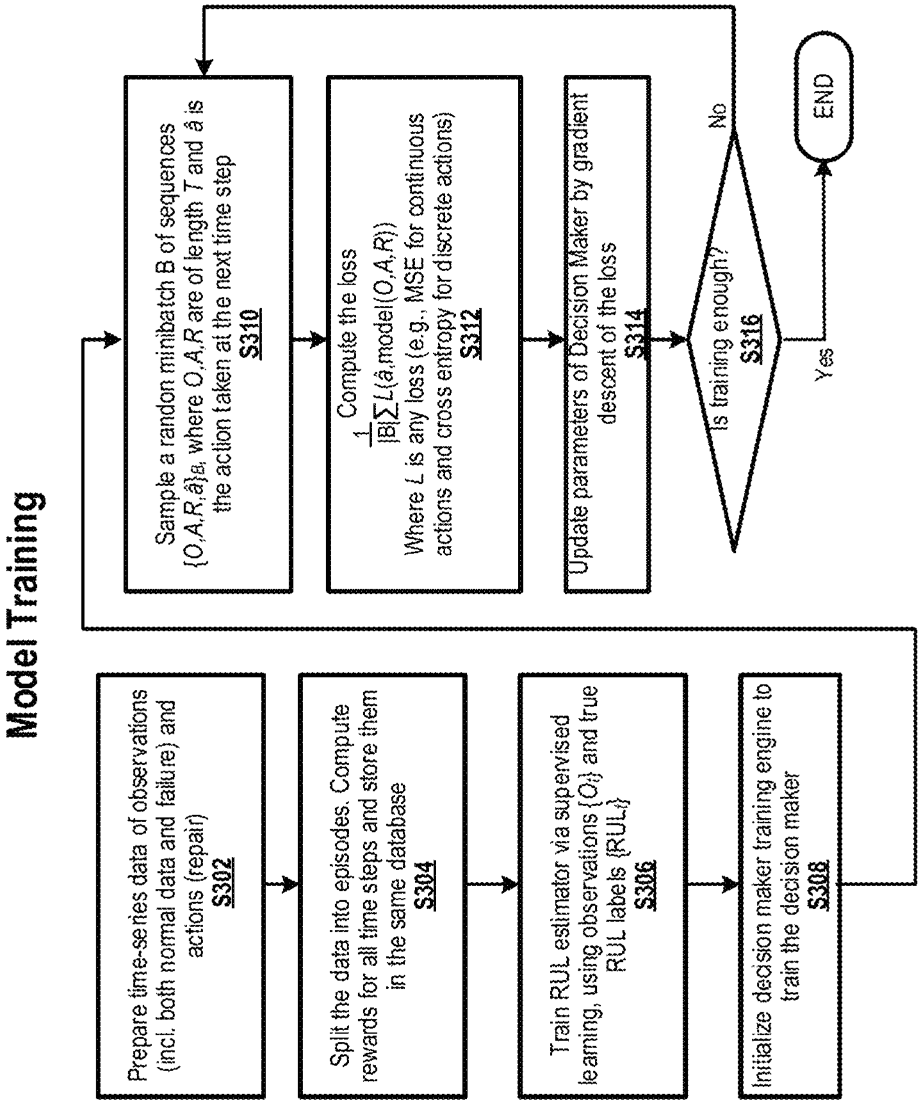
FIG. 3 illustrates an example process flow of the RL model's model training phase, in accordance with an example implementation.

FIG. 3 illustrates an example process flow of the RL model's model training phase, in accordance with an example implementation. At S302, time-series data of observation, including both normal data and failure, and action/repair are prepared/received. At S304, the data is split into episodes. Rewards are computed for all times steps and stored in the database 212. At S306, the RUL estimator is trained using supervised learning through use of observations $\{o_t\}$, and true RUL labels $\{RUL_t\}$.

At S308, the decision maker training engine 210 is initialized to train the decision maker 102. A random mini-batch/batch B of sequences $\{O, A, R, \hat{a}\}_B$ is sampled by the decision maker training engine 210 at S310, where O, A, R are of length T, and $\hat{a}$ is the action taken at the next time step.

O is current observation, A is action executed in the environment, and R is associated reward.

At S312, loss is computed with the function:

$$\frac{1}{|B|}\sum\mathcal{L}(\hat{a}, \text{model}(O, A, R))$$

where $\mathcal{L}$ is any loss such as, but not limited to, mean squared error (MSE) for continuous actions, cross entropy for discrete actions, etc.

At S314, parameters of the decision maker 102 are updated by the gradient descent of the loss in order to minimize the loss function. At S316, a determination is made as to whether enough model training has been performed. If the answer is no, then the process returns to S310 for further training of the model. If the answer is yes, then the process comes to an end.

Figure 4:
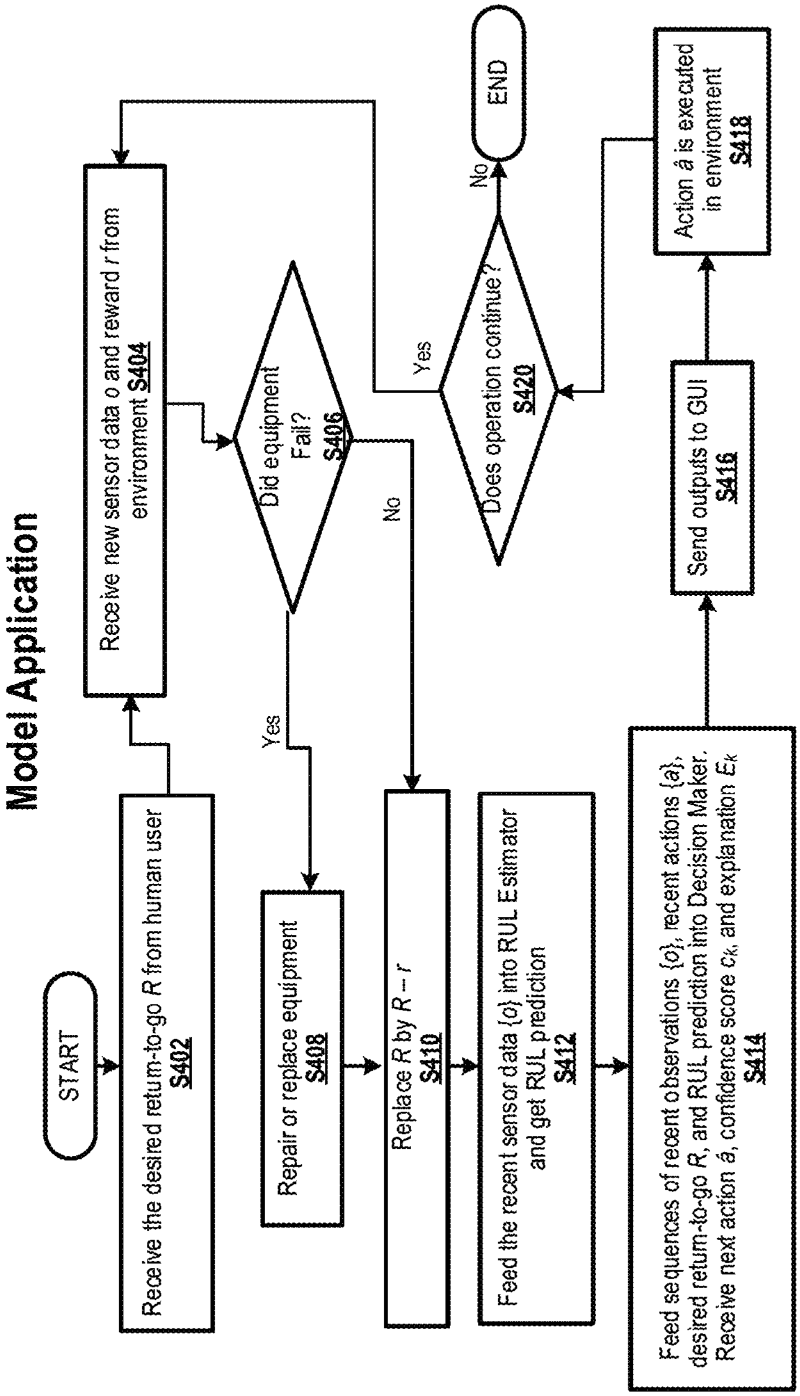
FIG. 4 illustrates an example process flow of the RL model's application, in accordance with an example implementation.

FIG. 4 illustrates an example process flow of the RL model's application, in accordance with an example implementation. At S402, desired return-to-go, R, is received from the user. The desired return-to-go is entered into the decision maker 102 to discriminate good behaviors from bad behaviors. Historical records are usually a mixture of good episodes (low cost) and bad episodes (high cost; too many failures and/or repairs). By specifying a high return, this encourages the RL agent to output actions that are well aligned with "best practice" in the dataset. Choosing an unrealistically large value will end up with failures due to uncontrolled extrapolations.

At S404, new sensor data o and reward r are received from the environment. At S406, a determination is made as to whether the equipment has failed. If the answer is no, then the process proceeds to S410. If the answer is yes, then the process proceeds to S408, where the equipment is repaired or replaced, and the process proceeds to S410. At S410, R is replaced by R-r.

At S412, the sensor data/recent observations {o} is fed into the RUL estimator 104 and the outputted RUL prediction is received. At S414, recent sensor data/observations {o}, recent actions {a}, desired return-to-go R, and RUL prediction are fed into the decision maker 102. In addition, outputs from the decision maker 102 including next action â, confidence score $c_k$, and explanation $E_k$ are received. At S416, the outputs are sent to the GUI 218. At S418, the next action a is executed in the environment. At S420, a determination is made as to whether the operation is to continue. If the answer is yes, then the process returns to S404 for further processing. If the answer is no, then the process comes to an end.

The foregoing example implementation may have various benefits and advantages. For example, the data-driven approach enables automation of optimized predictive maintenance decisions without the need for domain knowledge of experts. Inference time of a trained RL agent is much shorter than conventional mathematical optimization methods. At the same time, since the RL method is capable of working offline, there is no need for a costly high-fidelity equipment simulator. In contrast to methods based on failure likelihood or RUL estimation, which require operators to interpret ML outputs, the offline RL method yields the optimal decision itself. Through provision of past operation data, complex maintenance scheduling that deals with asynchronous repair of multiple components, state-dependent repair cost, etc. can be done without explicit modeling of individual interdependence.

Figure 5:
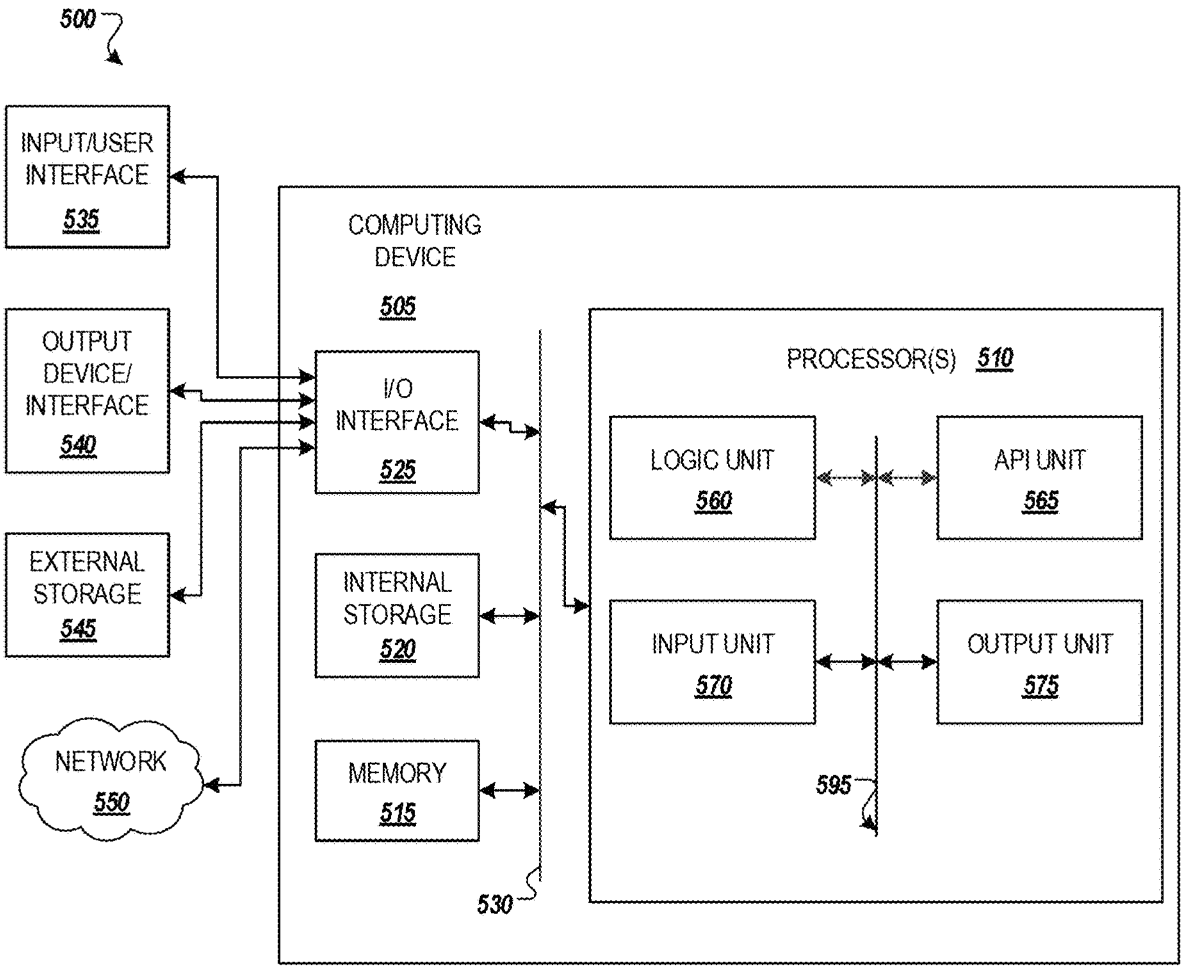
FIG. 5 illustrates an example computing environment with an example computer device suitable for use in some example implementations.

FIG. 5 illustrates an example computing environment with an example computer device suitable for use in some example implementations. Computing device 505 in computing environment 500 can include one or more processing units, cores, or processor(s) 510, memory 515 (e.g., RAM, ROM, and/or the like), internal storage 520 (e.g., magnetic, optical, solid-state storage, and/or organic), and/or IO interface 525, any of which can be coupled on a communication mechanism or bus 530 for communicating information or embedded in the computing device 505. IO interface 525 is also configured to receive images from cameras or provide images to projectors or displays, depending on the desired implementation.

Computing device 505 can be communicatively coupled to input/user interface 535 and output device/interface 540. Either one or both of the input/user interface 535 and output device/interface 540 can be a wired or wireless interface and can be detachable. Input/user interface 535 may include any device, component, sensor, or interface (physical or virtual) that can be used to provide input (e.g., buttons, touch-screen interface, keyboard, a pointing/cursor control, microphone, camera, braille, motion sensor, accelerometer, optical reader, and/or the like). Output device/interface 540 may include a display, television, monitor, printer, speaker, braille, or the like. In some example implementations, input/user interface 535 and output device/interface 540 can be embedded with or physically coupled to the computing device 505. In other example implementations, other computer devices may function as or provide the functions of input/user interface 535 and output device/interface 540 for a computing device 505.

Examples of computing device 505 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 505 can be communicatively coupled (e.g., via IO interface 525) to external storage 545 and network 550 for communicating with any number of networked components, devices, and systems, including one or more computer devices of the same or different configuration. Computing device 505 or any connected computer device can be functioning as, providing services of, or referred to as a server, client, thin server, general machine, special-purpose machine, or another label.

IO interface 525 can include, but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 500. Network 550 can be any network or combination of networks (e.g., the Internet, local area network, wide area network, a telephonic network, a cellular network, satellite network, and the like).

Computing device 505 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computing device 505 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 510 can execute under any operating system (OS) (not shown), in a native or virtual environment. One or more applications can be deployed that include logic unit 560, application programming interface (API) unit 565, input unit 570, output unit 575, and inter-unit communication mechanism 595 for the different units to communicate with each other, with the OS, and with other applications (not shown). The described units and elements can be varied in design, function, configuration, or implementation, and are not limited to the descriptions provided. Processor(s) 510 can be in the form of hardware processors such as central processing units (CPUs) or in a combination of hardware and software units.

In some example implementations, when information or an execution instruction is received by API unit 565, it may be communicated to one or more other units (e.g., logic unit 560, input unit 570, output unit 575). In some instances, logic unit 560 may be configured to control the information flow among the units and direct the services provided by API unit 565, the input unit 570, the output unit 575, as in some example implementations described above. For example, the flow of one or more processes or implementations may be controlled by logic unit 560 alone or in conjunction with API unit 565. The input unit 570 may be configured to obtain input for the calculations described in the example implementations, and the output unit 575 may be configured to provide an output based on the calculations described in example implementations.

Processor(s) 510 can be configured to receive expected future return value as input to a decision maker model, wherein the decision maker model is a machine learning model that predicts maintenance action associated with the equipment as shown in FIGS. 1-2 and 4. The processor(s) 510 may also be configured to feed recent observations and recent actions from environment as inputs to the decision maker model as shown in FIGS. 1-2 and 4. The processor(s) 510 may also be configured to generate a next action as model outputs of the decision maker model, wherein the next action is the predicted maintenance action as shown in FIGS. 1-2 and 4. The processor(s) 510 may also be configured to execute the next action in the environment as shown in FIGS. 1-2 and 4.

The processor(s) 510 may also be configured to compare the confidence score against a threshold as shown in FIGS. 1-2. The processor(s) 510 may also be configured to, if the confidence score is below the threshold, retrain the machine learning model with observations observed more recent in time than the recent observations and actions observed more recent in time than the recent actions as inputs as shown in FIGS. 1-2. The processor(s) 510 may also be configured to display the model outputs on a graphical user interface (GUI) as shown in FIG. FIGS. 2 and 4.

The processor(s) 510 may also be configured to feed the recent observations as input to a remaining useful life (RUL) estimator as shown in FIGS. 1-4. The processor(s) 510 may also be configured to generate estimated remaining useful life of the equipment as output from the RUL estimator as shown in FIGS. 1-4. The processor(s) 510 may also be configured to feed the generated estimated remaining useful life of the equipment as input to the decision maker model in generating the next action as shown in FIGS. 1-2 and 4.

The processor(s) 510 may also be configured to display the model outputs and the estimated remaining useful life of the equipment on a graphical user interface (GUI) as shown in FIGS. 2 and 4. The processor(s) 510 may also be configured to identify a subset of the inputs that are relevant to the generation of the decision maker model's model outputs, wherein the subset of the inputs directly impacts the generation of the next action as shown in FIG. 3.

The processor(s) 510 may also be configured to store data from a plurality of sensors as the recent observations and the recent actions in a database as shown in FIGS. 1-2. The processor(s) 510 may also be configured to retrieve the recent observations and the recent actions from the database as shown in FIGS. 1-2 and 4.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible media such as, but not limited to, optical disks, magnetic disks, read-only memories, random access memories, solid-state devices, and drives, or any other types of tangible or non-transitory media suitable for storing electronic information. A computer readable signal medium may include media such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. An offline reinforcement learning method for predictive maintenance of equipment, the method comprising:
- receiving an expected future return value as input to a decision maker model, wherein the decision maker model is a machine learning model that predicts a maintenance action associated with the equipment;
- feeding recent observations and recent actions from an environment as inputs to the decision maker model;
- generating a next action as model outputs of the decision maker model, wherein the next action is the predicted maintenance action associated with the equipment, a confidence score indicating reliability of the next action, and explanation information comprising feature-wise explanation identifying which input features are most responsible for the next action and instance-wise explanation showing which training samples from an offline reinforcement learning dataset comprising past maintenance observations, actions, and rewards most influenced the predicted maintenance action; and
- executing the next action in the environment.

2. The method of claim 1, wherein the explanation information is configured to be applied for root cause analysis of equipment failures to identify which part of the equipment has an anomaly detected.

3. The method of claim 2, further comprising:
- comparing the confidence score against a threshold; and
- if the confidence score is below the threshold, retraining the machine learning model with observations observed more recent in time than the recent observations and actions observed more recent in time than the recent actions as inputs,
- wherein retraining the machine learning model comprises using a decision maker training engine to randomly draw sample batches from a database and update parameters using gradient descent.

4. The method of claim 1, further comprising displaying the model outputs on a graphical user interface (GUI).

5. The method of claim 1, further comprising:
- feeding the recent observations as input to a remaining useful life (RUL) estimator;
- generating estimated remaining useful life of the equipment as output from the RUL estimator; and
- feeding the generated estimated remaining useful life of the equipment as input to the decision maker model in generating the next action.

6. The method of claim 5, further comprising displaying the model outputs and the estimated remaining useful life of the equipment on a graphical user interface (GUI).

7. The method of claim 1, further comprising:
- identifying a subset of the inputs that are most responsible to the generation of the decision maker model's outputs, wherein the subset of the inputs directly impacts the generation of the next action.

8. The method of claim 1, further comprising:
- storing data from a plurality of sensors as the recent observations and the recent actions in a database; and
- retrieving the recent observations and the recent actions from the database.

9. A non-transitory computer readable medium, storing instructions for predictive maintenance of equipment, the instructions, when executed by a processor, performing operations comprising:
- receiving an expected future return value as input to a decision maker model, wherein the decision maker model is a machine learning model that predicts a maintenance action associated with the equipment;
- feeding recent observations and recent actions from an environment as inputs to the decision maker model;
- generating a next action as model outputs of the decision maker model, wherein the next action is the predicted maintenance action associated with the equipment, a confidence score indicating reliability of the next action, and explanation information comprising feature-wise explanation identifying which input features are most responsible for the next action and instance-wise explanation showing which training samples from an offline reinforcement learning dataset comprising past maintenance observations, actions, and rewards most influenced the predicted maintenance action; and
- executing the next action in the environment.

10. The non-transitory computer readable medium of claim 9, wherein the instance-wise explanation is generated using an influence function.

11. The non-transitory computer readable medium of claim 10, further comprising:
- comparing the confidence score against a threshold; and
- if the confidence score is below the threshold, retraining the machine learning model with observations observed more recent in time than the recent observations and actions observed more recent in time than the recent actions as inputs,
- wherein retraining the machine learning model comprises using a decision maker training engine to randomly draw sample batches from a database and update parameters using gradient descent.

12. The non-transitory computer readable medium of claim 9, further comprising displaying the model outputs on a graphical user interface (GUI).

13. The non-transitory computer readable medium of claim 9, further comprising:
feeding the recent observations as input to a remaining useful life (RUL) estimator;
generating estimated remaining useful life of the equipment as output from the RUL estimator; and
feeding the generated estimated remaining useful life of the equipment as input to the decision maker model in generating the next action.

14. The non-transitory computer readable medium of claim 13, further comprising displaying the model outputs and the estimated remaining useful life of the equipment on a graphical user interface (GUI).

15. The non-transitory computer readable medium of claim 9, further comprising:
identifying a subset of the inputs that are most responsible to the generation of the decision maker model's outputs, wherein the subset of the inputs directly impacts the generation of the next action.

16. The non-transitory computer readable medium of claim 9, further comprising:
storing data from a plurality of sensors as the recent observations and the recent actions in a database; and
retrieving the recent observations and the recent actions from the database.

17. An offline reinforcement learning method for predictive maintenance of equipment, the method comprising:
preparing time-series data of past observations and associated past actions;
splitting the time-series data into episodes and computing rewards associated with the episodes;
storing the episodes and the rewards in a database;
initializing a decision maker model, wherein the decision maker model is a machine learning model that predicts a maintenance action associated with the equipment;
training the decision maker model by randomly drawing a sample batch from the database, computing loss associated with the sample batch, and updating parameters of the decision maker model using gradient descent of the loss;
receiving an expected future return value as input to the decision maker model;
feeding recent observations and recent actions from an environment as inputs to the decision maker model;
generating a next action as model outputs of the decision maker model, wherein the next action is the predicted maintenance action associated with the equipment, a confidence score indicating reliability of the next action, and explanation information comprising feature-wise explanation identifying which input features are most responsible for the next action and instance-wise explanation showing which training samples from an offline reinforcement learning dataset comprising past maintenance observations, actions, and rewards most influenced the predicted maintenance action; and
executing the next action in the environment.

18. The method of claim 17, the sample batch comprising sequences of past observations, past actions, and associated expected future return value.

19. The method of claim 1, wherein the feature-wise explanation is generated using at least one of Local Interpretable Model-agnostic Explanations (LIME), SHapley Additive explanations (SHAP), or Gradient-weighted Class Activation Mapping (Grad-CAM).

20. The method of claim 1, wherein the confidence score is generated using at least one of a Bayesian neural network, Deep Ensembles, Monte Carlo Dropout, or Quantile Neural Network.

* * * * *